United States Patent
Arsovski et al.

(10) Patent No.: US 8,793,365 B2
(45) Date of Patent: Jul. 29, 2014

(54) ENVIRONMENTAL AND COMPUTING COST REDUCTION WITH IMPROVED RELIABILITY IN WORKLOAD ASSIGNMENT TO DISTRIBUTED COMPUTING NODES

(75) Inventors: Igor Arsovski, Williston, VT (US); Anthony Richard Bonaccio, Shelburne, VT (US); Hayden C. Cranford, Jr., Cary, NC (US); Alfred Degbotse, Colchester, VT (US); Joseph Andrew Iadanza, Hinesburg, VT (US); Todd Edwin Leonard, Williston, VT (US); Pradeep Thiagarajan, South Burlington, VT (US); Sebastian Theodore Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 12/397,897

(22) Filed: Mar. 4, 2009

(65) Prior Publication Data
US 2010/0228861 A1    Sep. 9, 2010

(51) Int. Cl.
*G06F 15/173* (2006.01)
(52) U.S. Cl.
USPC ........... 709/224; 713/340; 718/102; 718/103; 718/104; 718/105
(58) Field of Classification Search
USPC .................................. 713/340; 718/102–105
See application file for complete search history.

(56) References Cited

U.S. PATENT DOCUMENTS

| | | | |
|---|---|---|---|
| 6,014,700 A | 1/2000 | Bainbridge et al. | |
| 7,124,188 B2 * | 10/2006 | Mangipudi et al. | 709/226 |
| 7,197,433 B2 * | 3/2007 | Patel et al. | 702/188 |
| 7,742,830 B1 * | 6/2010 | Botes | 700/32 |
| 2003/0009265 A1 | 1/2003 | Edwin | |
| 2003/0193777 A1 * | 10/2003 | Friedrich et al. | 361/687 |
| 2006/0059492 A1 | 3/2006 | Fellenstein et al. | |
| 2006/0277549 A1 | 12/2006 | Li et al. | |

(Continued)

OTHER PUBLICATIONS

Austin Conference on Energy-Efficient Design, Feb. 25-27, 2002, pp. 1-18.

(Continued)

*Primary Examiner* — Duyen Doan
(74) *Attorney, Agent, or Firm* — Scully, Scott, Murphy & Presser, P.C.; Richard Kotulak, Esq.

(57) ABSTRACT

A system and method of allocating a job submission for a computational task to a set of distributed server farms each having at least one processing entity comprising; receiving a workload request from at least one processing entity for submission to at least one of the set of distributed server farms; using at least one or more conditions associated with the computational task for accepting or rejecting at least one of the server farms to which the job submission is to be allocated; determining a server farm that can optimize the one or more conditions; and dispatching the job submission to the server farm which optimizes the at least one of the one or more conditions associated with the computational task and used for selecting the at least one of the server farms.

28 Claims, 8 Drawing Sheets

(56) References Cited

U.S. PATENT DOCUMENTS

| | | | |
|---|---|---|---|
| 2007/0179640 A1 | 8/2007 | Moughler | |
| 2008/0104383 A1* | 5/2008 | Ardagna et al. | 713/1 |
| 2008/0234873 A1* | 9/2008 | Gorbatov et al. | 700/291 |
| 2009/0012633 A1* | 1/2009 | Liu et al. | 700/90 |
| 2009/0106571 A1* | 4/2009 | Low et al. | 713/310 |
| 2009/0119233 A1* | 5/2009 | Dunagan et al. | 705/412 |
| 2009/0164811 A1* | 6/2009 | Sharma et al. | 713/310 |
| 2009/0265568 A1* | 10/2009 | Jackson | 713/320 |
| 2010/0037225 A1* | 2/2010 | Doyle et al. | 718/102 |
| 2010/0217454 A1* | 8/2010 | Spiers et al. | 700/300 |
| 2011/0107332 A1* | 5/2011 | Bash | 718/1 |
| 2011/0161968 A1* | 6/2011 | Bash et al. | 718/102 |

OTHER PUBLICATIONS

Patel et al., "Energy Aware Grid: Global Workload Placement based on Energy Efficiency", Nov. 21, 2002, Internet Systems and Storage Laboratory, Hewlett Packard Company, HPL-2002-329, pp. 1-9.

Erwin et al., "Using an Optimization Software to Lower Overall Electric Production Costs for Southern Company", Interfaces 21: 1 Jan.- Feb. 1991, pp. 27-41.

Moore, "Automated Cost—Aware Data Center Management" Thesis for Dept. of Computer Science, Duke University, 2006, pp. 1-140.

"Time Zone Driven Workload Migration for Globalized Companies", IBM, Jul. 31, 2006, pp. 1-3.

Dietrich et al., "Carbon Analysis Model of Supply Chains", IBM Corporation, 2007, pp. 1-27.

\* cited by examiner

| GRID INFO DATABASE | | | |
|---|---|---|---|
| SERVER FARM DATABASE | | | |
| SERVER FARM | MAX RECOMMENDED POWER HANDLING CAPABILITY | RED ZONE RANGE | REAL TIME POWER CONSUMPTION |
| SF 1 | X1 | DX1 | Y1 |
| SF 2 | X2 | DX2 | Y2 |
| ⋮ | | | |
| SF n | Xn | DXn | Yn |

| JOB PRIORITY DATABASE | | |
|---|---|---|
| SERVER FARM | JOBS | PRIORITY RATING |
| SF 1 | JOB1_SF1 | PR1_SF1 |
| | JOB2_SF1 | PR2_SF1 |
| | ⋮ | ⋮ |
| | JOBn_SF1 | PRn_SF1 |
| SF 2 | JOB1_SF2 | PR1_SF2 |
| | JOB2_SF2 | PR2_SF2 |
| | ⋮ | ⋮ |
| | JOBn_SF2 | PRn_SF2 |
| ⋮ | | |
| SF n | | |

| GRID INFO DATABASE | | | |
|---|---|---|---|
| POWER PROVIDER DATABASE | | SF_1 | Upto SFn |
| PP 1 | GREEN RATING % | PP1_GR | |
| | AVAILABILITY TO SF (YES=1, NO=0) | PP1_SF1_AVAIL | |
| | REAL TIME POWER SUPPLIED | PP1_POWER | |
| | USAGE COST | PP1_USAGE_COST | |
| | POWER TRANSMISSION COST | PP1_SF1_TXCOST | |
| PPn | GREEN RATING % | PPn_GR | |
| | AVAILABILITY TO SF (YES=1, NO=0) | PPn_STN_AVAIL | |
| | REAL TIME POWER SUPPLIED | PPn_POWER | |
| | USAGE COST | PPn_USAGE_TXCOST | |
| | POWER TRANSMISSION COST | PPn_SF1_COST | |
| | TOTAL POWER AVAILABLE TO SF | NETPWR_SF1 = (X=1 TOn): SUM(PPX_SF1_AVAIL x PPX_POWER) | |
| | NET GREEN RATING OF SF (%) | NETGR_SF1 = (X=1 TOn): SUM(PPX_SF1_AVAIL x PPX_GR x PPX_POWER)/NETPWR_SF1 | |
| | NET COST OF SF (USAGE + TRANSMISSION) | NETCOST_SF1 = (X=1 TOn): SUM(PPX_SF1_AVAIL x PPX_USAGE_COST) + SUM(PPX_SF1_TXCOST) | |

ENVIRONMENTAL AND COMPUTING COST REDUCTION WITH IMPROVED RELIABILITY IN WORKLOAD ASSIGNMENT TO DISTRIBUTED COMPUTING NODES

BACKGROUND OF THE INVENTION

1. Field of the Invention

This invention relates generally to a global job distribution system and more particularly to assigning computational tasks according to a selectable set of criteria.

2. Description of the Related Art

Currently large national and multinational corporations rely on high-end computing power to enable and/or efficiently operate their businesses. To satisfy the continually increasing demand for computing power in these organizations, sets of servers and memory units are grouped together into clusters which are commonly known as server farms. These server farms, with their concentration of high performance CPUs, require significant amounts of electrical energy to operate. Energy demand for these server farms is further increased by operating the air conditioning or other mechanical chilling/cooling systems to keep the computing equipment cool. Server energy demand has driven at least one large scale data processing company to locate their newest server farms close to an economical power source such as a hydroelectric dam.

While multi-national companies operate clusters or farms of servers at multiple locations in the U.S. and throughout the world to handle data processing workload, a job assignment to a particular server in a particular cluster is still largely performed on a local basis where the job submitter selects a particular cluster by logging into the cluster, or is part of a group of users assigned to a cluster by geographical region. This workload may come from within a company, from customers accessing company databases via the Intranet or Internet or through data-processing lease agreements where a company without servers leases server capability from an enterprise company. Recently, some attention within the data processing community has been devoted to allocating data processing resource on a global level in order to optimally utilize available resource. In those instances where the workload on the servers is considered when assigning data processing or other computer jobs to a particular server node and server, no consideration is given in the job dispatching process to the sources of energy which will be used to power the server farm (coal, oil, nuclear, hydro, solar), the local cost of energy or the condition of the local energy grid. As a result, job dispatch is not conducted in a manner which can minimize operational costs and/or use the most environmentally friendly energy sources while performing the necessary data processing workload. Furthermore, company data processing operations may come into direct conflict with the needs of the local community during those periods when the electrical grid is under stress.

SUMMARY OF THE INVENTION

To overcome the shortcomings noted above, there is disclosed a global workload assignment algorithm which allows for at least the utilization of the most environmentally friendly power source while processing data, that can balance a customer's requirement for speed in processing data with cost and environmental objectives, that allows for increasing power needs of a data processing center to be adjusted for unusual local conditions which may impact both data processing reliability and community wellness, and/or provide a framework for competitiveness in the area of data processing.

In an embodiment there is disclosed a method of allocating a job submission for a computational task to a set of distributed server farms each having at least one processing entity comprising;

receiving a workload request from at least one processing entity for submission to at least one of the set of distributed server farm;

using at least one or more conditions associated with the computational task for accepting or rejecting at least one of the server farms to which the job submission is to be allocated;

determining a server farm that can optimize said one or more conditions; and dispatching the job submission to the server farm which optimizes the at least one of the one or more conditions associated with the computational task and used for selecting the at least one of the server farms.

In another embodiment there is disclosed a system of allocating a job submission for a computational task to a set of distributed server farms each having at least one processing entity comprising:

receiving means for receiving a workload request from at least one processing entity for submission to at least one of the set of distributed server farms;

selecting means using at least one or more criteria or conditions associated with the computational task for accepting or rejecting at least one of the server farms to which the job submission is to be allocated;

determining means for providing a server farm that can optimize said one or more conditions; and sending means for dispatching the job submission to the server farm which optimizes the at least one of the one or more conditions associated with the computational task and used for selecting the at least one of the server farms.

In still another embodiment there is disclosed a computer program product for use with a computer, the computer program product including a computer readable medium having recorded thereon a computer program or program code for causing the computer to perform a method for storing and retrieving data, the method comprising:

receiving a workload request from at least one processing entity for submission to at least one of the set of distributed server farms;

using at least one or more conditions associated with a computational task for accepting or rejecting at least one of the server farms to which the job submission is to be allocated;

determining a server farm that cam optimize said one or more conditions; and dispatching the job submission to the server farm which optimizes the at least one of the one or more conditions associated with the computational task and used for selecting the at least one of the server farms.

The foregoing has outlined, rather broadly, the preferred feature of the present invention so that those skilled in the art may better understand the detailed description of the invention that follows. Additional features of the invention will be described hereinafter that form the subject of the claim of the invention. Those skilled in the art should appreciate that they can readily use the conception and specific embodiment as a base for designing or modifying the structures for carrying out the same purposes of the present invention and that such other features do not depart from the spirit and scope of the invention is its broadest form.

BRIEF DESCRIPTION OF THE DRAWINGS

Other aspects, features, and advantages of the present invention will become more fully apparent from the following detailed description, the appended claims, and the accompanying drawings in which similar elements are given similar reference numerals.

DETAILED DESCRIPTION OF THE INVENTION

There is disclosed a global job and distributed submission system which assigns, and continually reassigns as needed, computational tasks according to a set of criteria of arbitrary number in which one or more of the following are included to manage a complex set of factors which are used for the computation of a computer job assignment. These factors can include environmental cost of power used at all server nodes, knowledge of current carbon credits and the difference in energy consumption, access to weather data bases, access to power supplier databases, and locally specified data compiled at each node which is considered important to the institution (business or other agency).

The computation assignment "engine" and algorithm embodied in program instructions that are executed herein continually examines a variety of factors, some of which are fixed prior to job submission, and others of which are in continual flux. If selected factors go outside a predetermined range for a specified factor, then any or all jobs may be reassigned at that time.

The assignment engine may operate to assign and dispatch workload, and monitor completion and reliability in the following areas:

Environmentally Conscious (Green) Workload Assignment:

The engine works to assign workload to one or more server farms that have the lowest environmental impact as measured by the power source used to power the farm, the server farm power performance product, the expected processing time of the workload and energy requirements for transporting the workload to the processing site.

Weather Risk Mitigation:

The engine may further link with other databases to determine when certain criteria, or conditions have occurred or are about to occur at the server farm location. For example, the farm's processing facilities/resources become at risk due to incipient weather events which may interrupt processing capabilities and/or communication with the processing site. Database links may include an official or private weather forecasting database that routinely issue watches and warnings when severe weather is expected. The engine may downgrade the effected processing resource such that a new workload will not be assigned to the at risk resource and/or the engine may move a presently assigned workload which may be exposed to the event and which has a long run time expectation to an alternate processing location.

Global Security Risk Mitigation:

The engine may also be linked to a security data base(s) such as that supplied by US Homeland Security or individual business firms. This can be used to direct, in a weighted fashion, the processing power to or from areas of relative safety or temporary instability, respectively. As world security conditions dynamically change, this mitigation may be used to enhance or override the other factors feeding data to the global workload assignment engine.

Grid Risk Mitigation:

In certain instances, such as on warm summer days when total demand on a power supplier may approach the capacity of the system and transmission capability is at its limit, the power supplier may be forced to bring on line a less environmentally friendly generating unit and/or power supply interruptions may occur with resulting data loss. When such conditions exist, the engine may further link with a supplier database to determine when generating and transmission resources are approaching their limits and work to divert or re-assign the processing workload to reduce power requirements and improve processing reliability.

Cost Competitiveness:

In a shared network where many processing providers (not just one company) have server farms that may take in one or more workloads from the engine, the engine may further receive data from each processing provider about processing costs in addition to capability, availability and efficiency. These costs may be constant or updated according to the type of workload and organization requesting the processing capacity, etc. The engine may operate to solicit bids for a workload and factor in the bid price for the workload, along with other factors such as the environmental impact, the expected job completion time, etc. in a manner which will manage its operation and balance the cost and/or environmental impact.

Carbon Trading Support:

The engine may further integrate the assignment of a workload to a "green" server resource with a carbon trading system which calculates carbon credits as a function of CO and/or $CO_2$ level differentials between the energy source used and a base $CO_2$ level used to calculate a carbon credit/debit.

Figure 1:
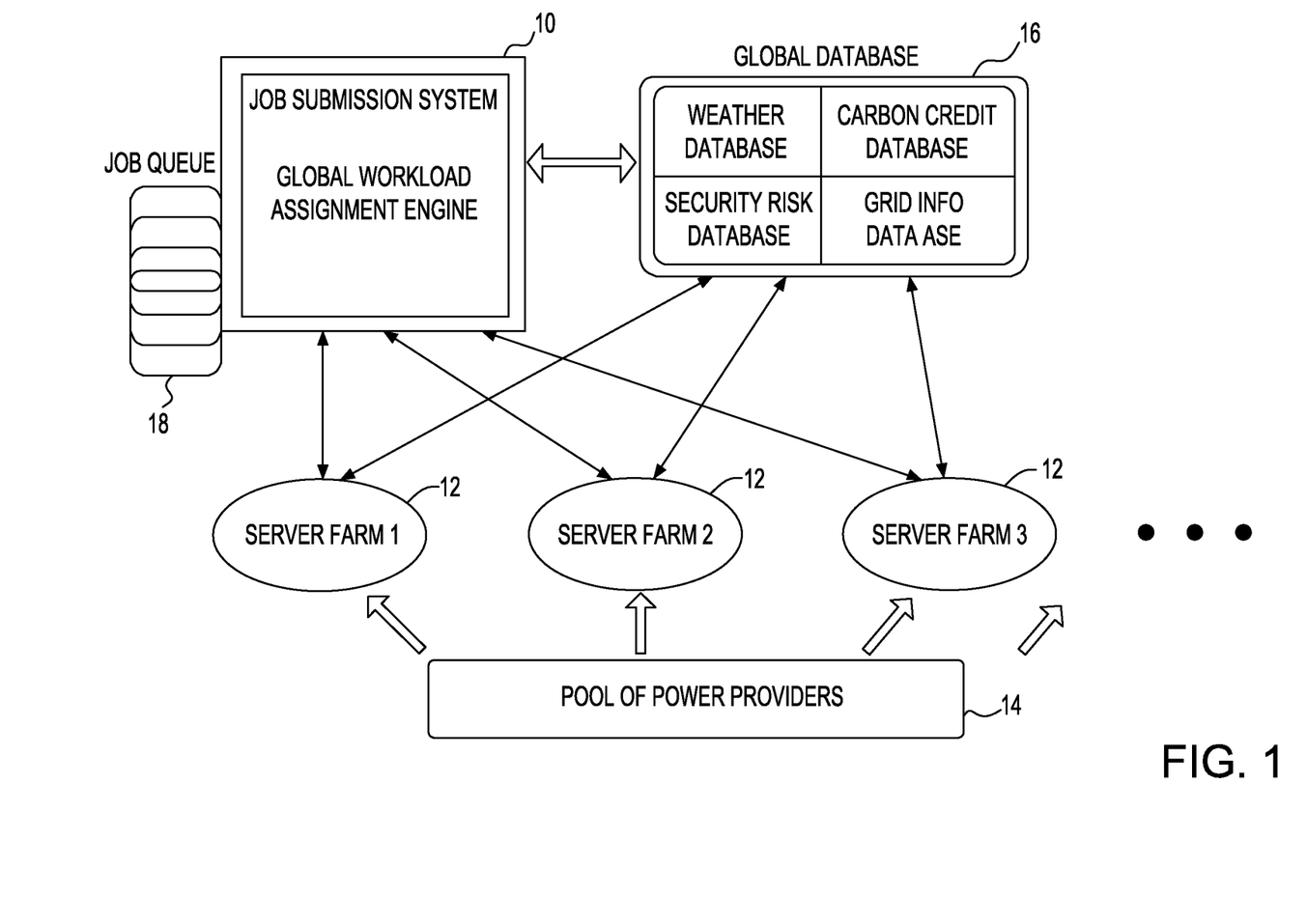
FIG. 1 is a view of a high level architecture in which a Global Workload Assignment Engine (GWAE) communicates with a multiplicity of server farms which may be in various geographic locations and maintains a job queue for the assignment of workload to the server farms.

Referring to FIG. 1, there is shown a high level architecture in which a Global Workload Assignment Engine (GWAE) 10 communicates with a multiplicity of server farms 12 which may be in various geographic locations and maintains a job queue 18 including one or more submitted work requests for the assignment of at least one workload to the server farms. Each server farm may have multiple computing devices, e.g., servers, each having varying processing capabilities, utilizations, costs and environmental footprints. Likewise, power providers 14 which provide the primary energy source for each farm may have different generation capability, utilization, cost, environmental footprint and interruption risk. The GWAE, through an interface with a number of different databases 16, considers the environmental footprint, processing and transmission costs along with typical factors in workload assignment such as processing availability and capability to assign a workload to each server farm in a manner which minimizes the environmental footprint, cost, or both. Further the GWAE monitors changing conditions to determine when work in progress should be moved from one server farm to another to further reduce the environmental footprint and/or cost, or to avoid a potential loss of work in progress. In an embodiment it could be set up as a privately run, public accessible resource, or it could be established by a private institution and leased.

Figure 2:
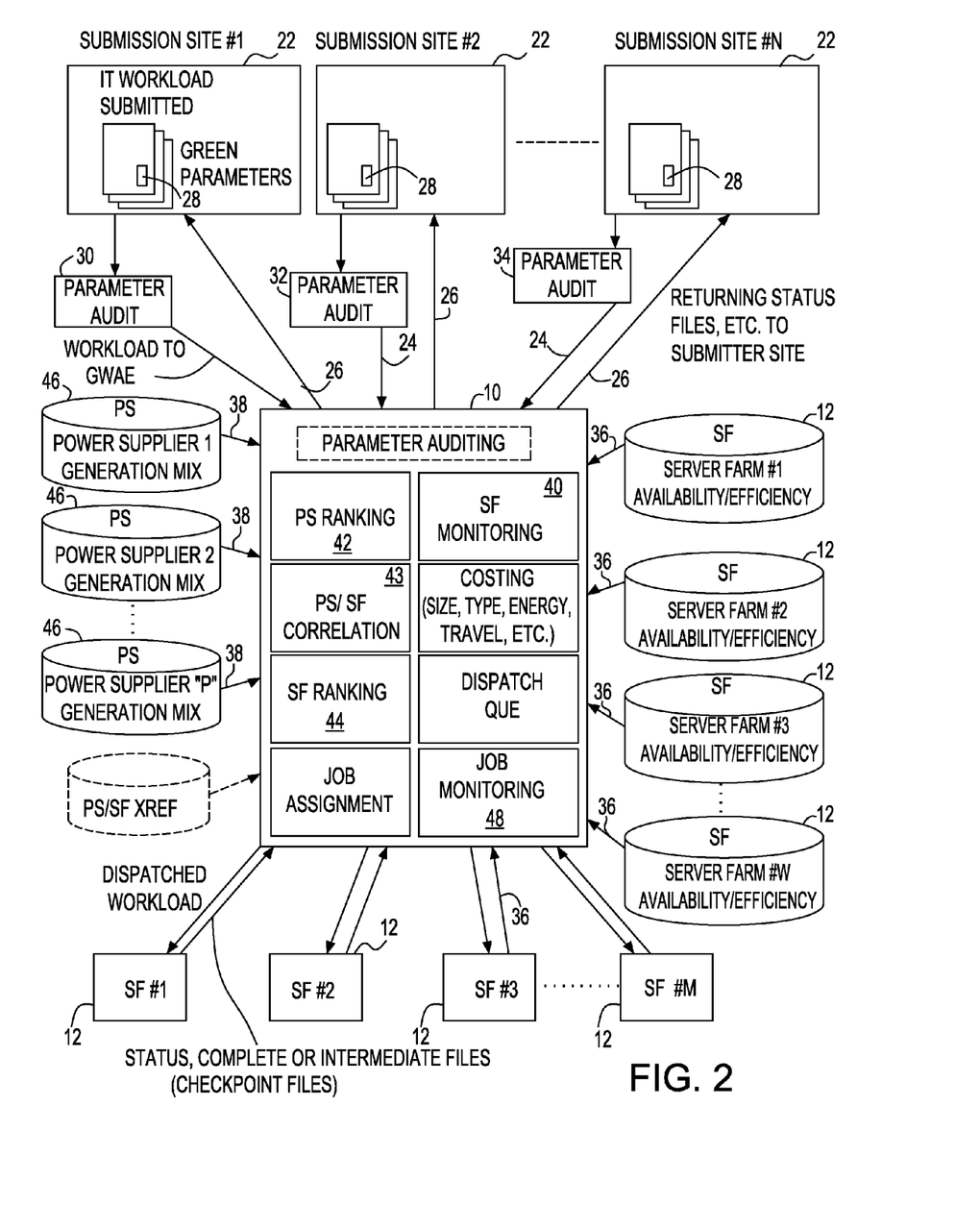
FIG. 2 is block diagram of a Global Workload Assignment Engine (GWAE)

Referring to FIG. 2, there is shown a block diagram of a Global Workload Assignment Engine (GWAE) 10 in accordance with the principles of the invention. The engine dispatches workloads that may be generated at multiple sites/geographies to a number of distributed server farm nodes 12 for execution. A site submitting workload to the GWAE may or may not have native processing resource to execute the workload. Should the submitting site have native capability, the GWAE considers native processing as one alternative in making the workload assignment.

Outgoing workload from each site 22 to the GWAE 10 contains a parameter file which contains parameters including, but not limited to: submitter identification attributes, outgoing 24 and incoming 26 data/file locations, processor requirements, memory requirements, expected execution time, software requirements, etc., used to place a workload on compatible execution platforms. As part of the method taught, the parameter file includes one or more "green" parameters 28 used to drive the assignment of workloads within a spectrum of server farm options that may contain both a mix of friendly and unfriendly environmental footprints. Green parameters weigh the selection of processing resources towards high performance capability, low cost capability or low-environmental impact capability. At its extreme, green parameters may be used to restrict processing to nodes with the lowest environmental impact. Regardless of the green parameter setting, the GWAE 10 operates to provide the lowest environmental impact while satisfying operational, performance and cost constraints.

Workload outgoing from each submitting site may be optionally audited to insure that "green" parameters match the range of settings allowed as a department, project or corporate policy. When implemented, this audit may be conducted by respective processing of data in blocks 30, 32, 34 on conductors 36, 38, and from 40, 42 and 44 shown in FIG. 2 in the outgoing data-stream from the submitting location, or as an audit processing module within the GWAE engine itself. In the former case, the site locally controls and updates audit settings for the data stream, and in the latter case, the department, project or company loads parameters to the GWAE and the GWAE differentiates between workloads based on identifier parameters.

The GWAE may operate to initially only receive the parameter information, perform the execution assignment and facilitate data/file communication directly between the submitting and executing sites. Alternatively, all required files may be sent to the GWAE in the initial transfer with the GWAE managing file transfer between the submitting and executing sites.

As additional inputs to the assignment process, the GWAE also receives input 36, through database query or from other means on each server farm available for workload assignment including, for example, server farm capacity availability, performance capability and energy efficiency. Energy efficiency data may include not only the energy demand/efficiency of the computer servers (primary energy consumption) but the demand/efficiency of the physical plant which supports the computer servers (air conditioners, water chillers, etc.). Database access may be provided in a web-based environment, by a dedicated link or by other means.

The GWAE also receives input 38, though database query or other means, information on the condition of each power provider which serves one or more server faun nodes in the GWAE system. Information continuously gathered may include, for example, the present load vs. capacity on the providers generation and transmission facilities as well as the present mix of power generation (i.e., fossil fuel, nuclear, solar, hydro, etc.) with percentages. Database access may be provided in a web-based environment, by dedicated link, or by other means. The GWAE may further query a power supplier—server farm cross reference which may be constant or continuously updated to determine which suppliers are contributing power to each server farm if the relation is not implicit for any server farm.

In order to place workloads in a manner which minimizes energy consumption and uses the most environmentally friendly power sources, a number of sub-processes operate within the GWAE.

A job queue within the GWAE operates to handle incoming workloads, for example, on a first-in-first-out (FIFO) basis, holding information on job parameters, green and other information necessary for assignment.

The GWAE monitors parameters 40 from each server farm, calculates and updates the energy consumption and environmental footprint per standardized unit of processing capacity based on the performance of available servers, the power those servers demand and the secondary power required to run the facility. Server farms are ranked 44 according to energy consumption in conjunction with green parameter performance/green weight in the parameter file. Further, the GWAE applies the calculations to the expected processing requirements for the request to calculate the total energy requirements. Expected processing requirements may be entered as parameter inputs or calculated based on past history for file sizes, software called, customer history, etc. Availability of servers within each server farm is used to further augment the ranking such that workload is not assigned to nodes that lack sufficient capacity.

While energy consumed may be principally driven by the executing server farm for large processing jobs, smaller jobs may use transmission energy which is significant in proportion to the processing energy when movement of data across geographies is considered. Because of this the GWAE estimates the energy required to transfer workload from the submitting site to the executing site for each assignment possibility. For small jobs, less total energy may be consumed when jobs are executed locally on less efficient systems than when the data is transmitted to a distant location.

In addition to ranking the server farms, the GWAE also ranks power suppliers 42. Suppliers operating from renewable resources are ranked above suppliers operating from fossil fuels. Where non-renewable sources are employed, the sources are ranked based on generation efficiency and environmental footprint per unit of energy produced. Where suppliers operate using a mix or renewable and non-renewable sources, supplier ranking is influenced by the percentage mix of the sources. Generation mix may further be used to calculate cost per unit of energy as well as environmental footprint for factoring into workload assignment. Ranking may be further augmented using preferences within the spectrum of renewable sources. For instance, solar or wind energy may be preferred over hydro energy due to concerns over water reserves, etc.

The GWAE further correlates ranked server farm data 44, FIG. 2, with ranked power supplier data from power suppliers 46, FIG. 2, to determine the server farm which best meets the submission parameter criteria. Server farms with the lowest environmental impact may be identified based on supplier and faint ranking/correlations 43 as well as data transfer energy estimation. Likewise, solutions with the lowest cost or the highest performance can be identified.

Workload assignment within the GWAE operates with ranking functions such as the one described above in conjunction with the green parameters associated with the workload. Workloads (jobs) marked for assignment on only those computing resources which are 100 percent renewable will be placed on nodes which have the required energy source profile. If no initiators are available, the jobs will remain in the queue until a resource is available. A workload not marked for 100 percent renewable computation will be assigned to the most-environmentally friendly resource available that meets the performance constraints at an assignment time. If a resource that is 100% renewable powered is available and no job requiring this profile exist in the queue, this workload is assigned to the fully renewable resource unless the resource does not meet the performance or other workload requirements. Should a new workload requiring the renewable resource be submitted, a workload which does not require fully renewable processing may be checkpointed and moved to the next available initiator as ranked. Checkpoint is defined as Flagging a job so that it is an indication for the job to be moved. Similarly, a workload originally assigned to a less environmentally friendly node by the GWAE may be moved to a more friendly node should initiators become available. Movement decisions may be based on an expected resource required to complete the workload as opposed to that required to checkpoint and transport the required files to another node, or other factors as well as initiator availability. As a default, the GWAE always works to assign a workload to the lowest environmental footprint solution considering energy consumption for transport and processing as well as the energy mix used at the processing site (in addition to performance or other installation requirements). For small jobs, the best solution as determined by the GWAE may be to run the job locally to avoid transport energy consumption. As a default, the GWAE operates to minimize the environmental footprint for the workload unless the performance/cost parameters make the execution on green resource impossible, in which case the GWAE operates to satisfy job parameters in the order of their importance as weighted in the parameter file.

Once an assignment is made, the GWAE either operates as an intermediary transferring required files from the submitting to the executing site or operates as a facilitator passing instruction to each of the submitting and executing sites for direct communication. Further, the GWAE may monitor the server farm 40 and workload status 48, FIG. 2, and communicate with the submitter and executor to facilitate any checkpoints or workload moves.

Weather Risk Mitigation

Figure 3:
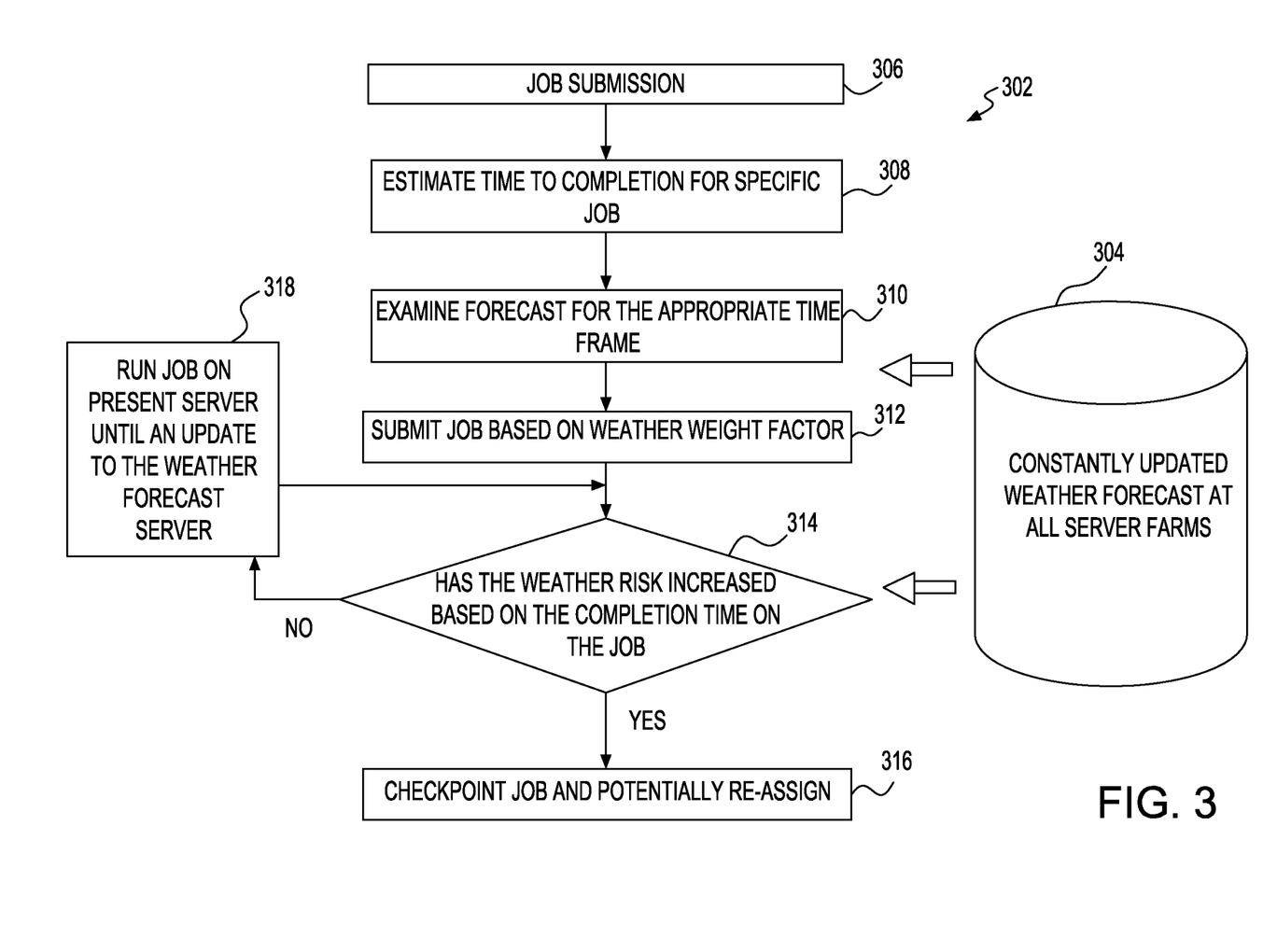
FIG. 3 is a flow chart of the function for weather mitigation.

As disclosed above and shown in the flow chart of FIG. 3, the method performed by the GWAE utilizes a number of databases to incorporate real time parametrics for server farms and power suppliers through web-based links, dedicated links or by other means into the workload placement algorithm. In another embodiment, the method may additionally comprise adaptive job assignment based on impending environmental events which may disrupt workload processing at any server farm or communication between a farm and the GWAE and/or the submitting node. Examples of environmental events that the GWAE may operate are watches, warnings, occurrences of hurricanes, tornadoes, flood or winter storms, although other events may be considered.

Referring to FIG. 3, to provide weather risk mitigation, flow chart 302 shows how the GWAE links to a weather prediction database 304 managed by a public or private entity, examples of which are National Weather Service (NOAA), Environment Canada, etc. to retrieve regional forecasts for geographic zones which contain server facilities and/or critical power production facilities. Each forecast may contain watches and warnings for severe weather events which may affect the ability to process one or more workloads or deliver power to a server farm along with the event type, probability of the event, and time frame for the event. The GWAE uses the additional information obtained from or accessed via the weather risk link, along with other server farm power supplier and job submission parameters to confirm initial job submission assignment by the GWAE (step 306). The mitigation method may comprise calculating expected completion time for workload on the selected node (step 308) and examining the forecast as provided by database 304 for the estimated processing timeframe (step 310). Once the GWAE determines that workload processing time will not overlap an at risk time period (step 312) that workload is eligible for submission to the farm in question. Thereafter, it is determined if the weather risk has increased based on the completion time on the job (step 314). If yes (YES; step 314), the job is checkpointed and potentially reassigned (step 316). If, however, weather risk to the workload has not substantially changed, (NO; step 314), the job is run on the present server to completion (step 318) or until a degradation in the weather forecast is received (step 314). Furthermore, weather information is routinely monitored for a defined set of adverse (or worsening) conditions, which would have the potential to disrupt the data processing. These changes in weather, once a workload is submitted to the farm and adverse changes in weather condition, may trigger checkpointing and possible movement of a workload to alternate farms. While the at-risk node may be under-utilized with regard to long running workload, the GWAE may preferentially route short run workloads to the at risk node in the interim period. The method may further comprise auditing an existing work load on the server node to determine if any workload is expected to still be running at the onset of the risk period, determining whether to checkpoint and move an affected workload from the affected node, and using the GWAE to reassign the checkpointed workload. Reassignment may be performed using a separate prioritized re-assignment queue within the GWAE or by prioritization within the submission queue of the GWAE. Additionally the method may further comprise GWAE prediction of outage probability based on the watch/warning presented, past history and, in some instances, more detailed weather data with a GWAE decision point for mitigation based on prediction.

While not considered a weather event, and not always predictable, other natural disasters such as earthquakes, volcanic activity and tsunamis may be mitigated in the same manner assessing risk time frame and diverting workload to non-compromised processing resources.

Grid Risk Mitigation

As demands for energy increase faster than power suppliers can bring new power generation and transmission facilities, suppliers have instituted programs that notify the industry and the public during periods where peak energy requirements are estimated to be close to the maximum generation/transmission capability of the geographic area. The goal of these programs is to request conservation/reduction of utilization in order to prevent either rolling blackouts or utilization of short-term, less-efficient (dirtier) power supplies which drive up the cost/environmental impact.

As a corollary, server farms themselves may face periods of time when the energy consumed by the servers and the physical plant (cooling, etc) approximate or exceed the intended maximum designed power capability for the facility due to increases in capacity, transition to higher-power servers, or summer temperature extremes. In each case, completion of the workload currently running or queued for processing on the affected server farm becomes at risk.

Figure 4:
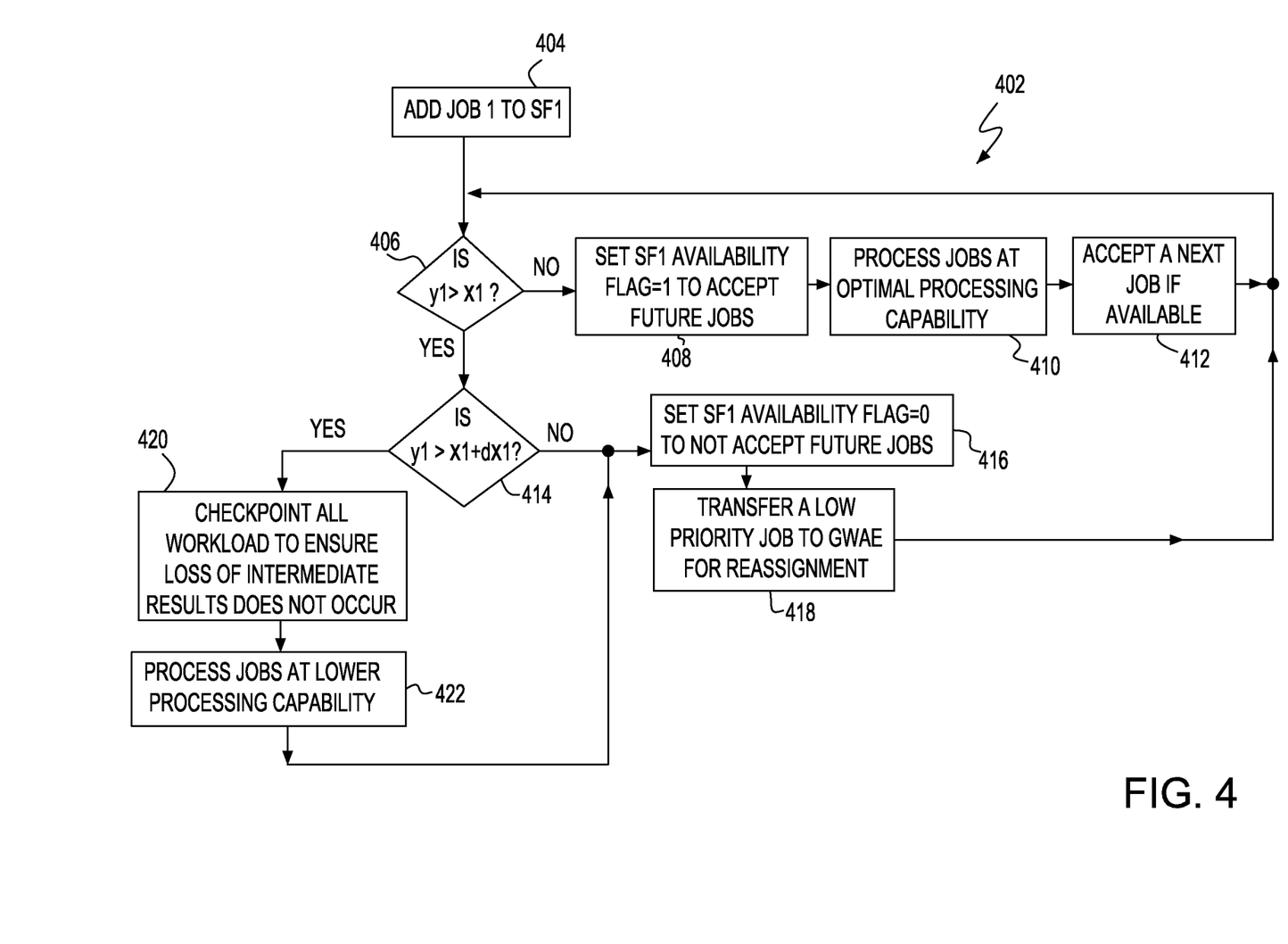
FIG. 4 is a flow chart of the function of monitoring workload and energy consumption.

Referring to FIG. 4, there is shown a flow chart of a function operation 402 within SF1, there being a similar function operation within each server farm to monitor workload and energy consumption and communicate status back to the GWAE through one or more links. To pick the correct variable from FIG. 5, for that SF, the Flow in FIG. 4 will actually have x2, dx2 and y2 for a SF2 flow. The flow in FIG. 4 will actually have xn, dxn and yn for SFn flow as defined in FIG. 5. Initially, after job 1 is added to SF1 (step 404), the function executed at a device within SF1 determines if y1 is greater than x1 where energy consumption (summation of processing energy, cooling energy, etc.) is monitored as y1 and where X1 is the desired normal power consumption maximum for the facility. If y1 is less than x1 (NO; step 406) the function proceeds to set SF1 availability flag=1 to accept future jobs (step 408). Thereafter, the function processes jobs at optional processing capability (step 410), then accepts a next job if available (step 412), and returns to step 406. If, however, at step 406, y1 is greater than x1 (YES; step 406), the process determines if y1 is greater than x1 plus dx1 where dx1 represents the allowable short term power consumption above the normal maximum x1. If it is not, (NO; step 414) the process sets SF1 availability flag to "0" to not accept future jobs (step 416), then transfers a low priority job to GWAE for reassignment (step 418) in order to return to y1<x1, and returns to step 406. If, at step 414 the function determines that y1 is greater than x1 plus dx1 (YES; step 414), the process checkpoints all workloads to ensure loss of intermediate results does not occur (step 420), then processes jobs at a lower processing capability (step 422) and advances to step 416.

Restating the above described function of grid risk mitigation, a workload assigned by the GWAE to a given SF1 is added to the processing workload, and energy consumption is monitored as "y1". If y1 is below the rated threshold "x1" for the facility, the SF communicates back to the GWAE that it is available for an additional workload through the server farm database (see FIG. 5, upper left block, lines 1 and 2). Once the amount of the workload forces y1 to be greater than threshold x1, the SF communicates back to the GWAE that it has reached/exceeded its designed power consumption and that it is no longer available for any additional workload.

Energy consumption y1 is checked against a second threshold "x1+dx1" to determine if the total energy consumption is below or above the worst case (short term) maximum for the facility. If y1 is below x1+dx1 the SF in communication with the GWAE begins to checkpoint lower priority workload for re-assignment to other SFs by the GWAE. Prioritization of the workload is maintained in the job priority database (see FIG. 5, lower left block). If y1 is above x1+dx1 the SF begins to checkpoint all workloads in order to ensure that intermediate results are not lost. Workloads may continue to be processed on the SF at lower processing capability (speed) in order to reduce power consumption below the short term maximum as a lower priority workload is reassigned by the GWAE in order to bring the server farm energy consumption to y1<x1.

Figure 5:
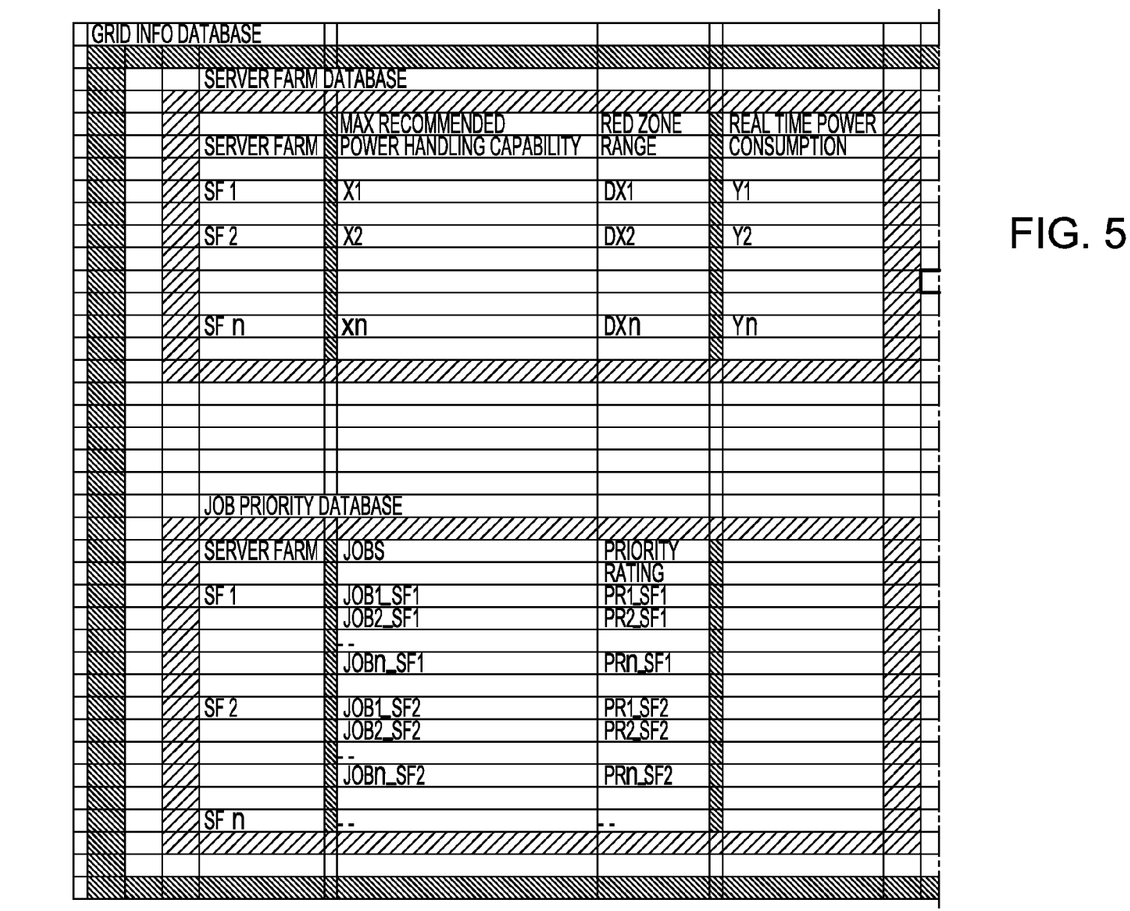
FIG. 5 is a chart of information for real time monitor of power, workload, job priority in different server farms as well as cost and green rating determination.

Referring to the chart of FIG. 5, the GRID INFO DATABASE comprises 3 databases—a server farm database, a Job priority data base and a Power provider database. Server Farm database keeps track of the maximum power handling capability, a tolerance indicating power level (red zone range) and Real time power consumption for EACH SF. Job Priority database keeps track of the real time individual jobs being processed by each SF and the priority of jobs under each SF. Power Provider database: the PP database keeps track of EACH Power provider's (PP) Green rating, Availability status to each of the SF, real time power supplied to each SF, Usage cost to each SF and power transmission cost to each SF. The database also keeps track of Each SF's total power contributed by the different PPs, Net green rating of each SF, and Net usage & transmission cost of each SF. To insulate the workload from power supply/transmission stresses, the databases from which the GWAE gets parameters for workload assignment are augmented to include messaging from suppliers/transmission operators on conditions and forecasting as the digital equivalent of "electrical load day" designations commonly provided to inform power customers of peak loading conditions. The power provider database provides, along with green rating % and cost information used in workload assignment above, information on power supply/transmission availability (capability, use) for each of the one or more power providers for each server farm. When power supply/transmission margins reach a threshold, the GWAE may act to prevent additional workload on the SF in question and possibly move one or more workloads in progress to other SFs to reduce the load on the suppliers/grid and insure that the workloads are completed.

Referring to FIG. 5, there is shown an information chart of an example of the result of a power provider ranking algorithm calculation of Net Green Rating (NETGR_SF1) for Server Farm One (SF1) where PP1 with 50% Green Rating provides 300 Kwatts to SF1;
PP2 with 20% Green Rating provides 200 Kwatts to SF1;
PP3 is not available for SF1; and
PP4 with 10% Green Rating provides 500 Kwatts to SF1.
Thus, the total power supplied by three Power Providers, PP1, PP2 and PP4 to Server Farm one (SF1) is NETPWR_SF1=300K+200K+0+500K=1000 Kwatts.

The Green Rating (GR) of SF1=NETGR_SF1=(300 Kwatts/1000 Kwatts)×50%+(200 Kwatts/1000 Kwatts)×20%+(500 Kwatts/1000 Kwatts)×10%=15%+4%+5%=24%

Cost Competitive Environment

Figure 6:
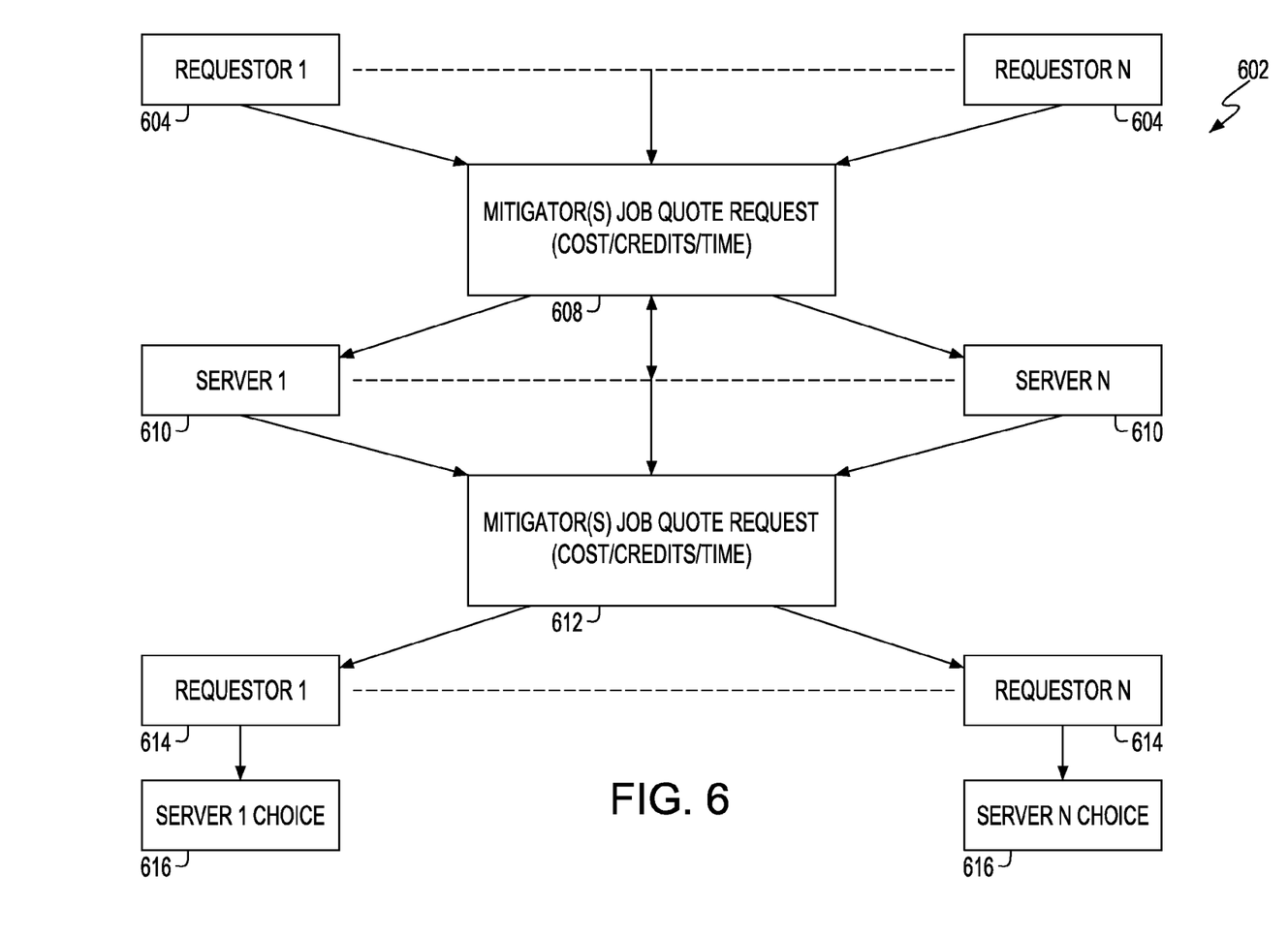
FIG. 6 is a flow chart of a mitigator function which analyzes processing requests from multiple submitters and sends a request-for-bid to each of the entities controlling processing resource.

The GWAE is not limited to distributing the workloads amongst server farms controlled by a single public or private entity, but may be expanded to perform gateway services to server farms owned by multiple companies or governments. When heterogeneous ownership of processing capacity exists, it is recognized that management of each server farm may be done in a competitive manner to obtain workload share. To enable competition between multiple server farm owners in a GWAE environment, the GWAE is programmed to provide a mitigator function 602 (FIG. 6). The mitigator function (at step 608) analyzes processing requests from multiple submitters (requestor(s) 604) and sends a request for bid to each of the entities controlling processing resources (server(s) 610). The request may contain information on hardware and software requirements, job size, performance, resource and/or green constraints. Each entity (server(s) 610) may bid on the workload in an effort to secure it. The bid may include quotes for one or more of processing cost, green processing capability, information transmission cost, processing time, or carbon credit earnings. The GWAE may select (step 612) a processing provider (server choice 616) for each requestor 614 for the subject workload based on any one factor or a weighting of factors to satisfy the workload submitter's requirements and optimize the processing constraints to the submitter's requirements. The GWAE mitigate function may limit the set of processing providers from which it requests bids based on present server farm workloads, software or hardware limitations, green factors, location factors, weather/grid factors or other factors to which the GWAE has knowledge. Within the GWAE mitigate function, processing providers may have the ability to target competitiveness to certain classes of customers and may have different response templates for different submitting customers, types of work, etc.

Integration into a Carbon Trading System

In another embodiment, the GWAE is enabled to handle carbon credit trading. Carbon credit trading is a rapidly evolving system where companies can purchase carbon credits to offset activities that produce carbon pollution above a threshold and/or earn carbon credits when activities produce carbon pollution below a threshold. The net effect of the carbon credit system is to cap/manage the amount of carbon being released to the environment and increase greener operation. For many industries that are data management or data processing intensive, primary and secondary energy used in processing IT workloads is a significant percentage of their carbon output and represents an opportunity for carbon trading.

In a GWAE adapted for carbon credit trading (CCT), new workload requests may be audited for information on whether the submitting entity is participating in CCT. If the entity is not participating in CCT, or participation is not mandated, submission through the GWAE operates as detailed above. If CCT is enabled, carbon credit (CC) information about the submitter may be audited to obtain the present CC balance, with the GWAE acting as a bookkeeper for credits. Should a positive CC balance exist, submission through the GWAE operates as detailed above, and the GWAE submits the workload based on cost, time and environmental parameters associated with the workload request, and the carbon trading credit for the newly submitted workload may be either positive or negative. The CC banking query may be based on only previous history, or include an estimate of carbon credit requirements should the requested workload be performed on a non-environmentally friendly server farm. Should a negative balance exist, the GWAE will query the submitter, or submitter database, to determine if carbon credits should be purchased to null the deficit, or estimated deficit. If CCs are purchased, the job assignment continues as if a positive CC balance existed. If additional CC purchases are refused, the GWAE limits submission opportunities for the requested workload to only those servers that will produce a net positive CC balance. Once a workload is submitted, the GWAE monitors the status of the workload and when the workload is completed, a calculation of CC earning/cost is made based on workload placement, run time, transmission costs etc., and GWAE book-keeping is updated accordingly. The GWAE CCT function operates to maintain a CCT neutral or alternatively, a CCT positive balance over time.

Figure 7:
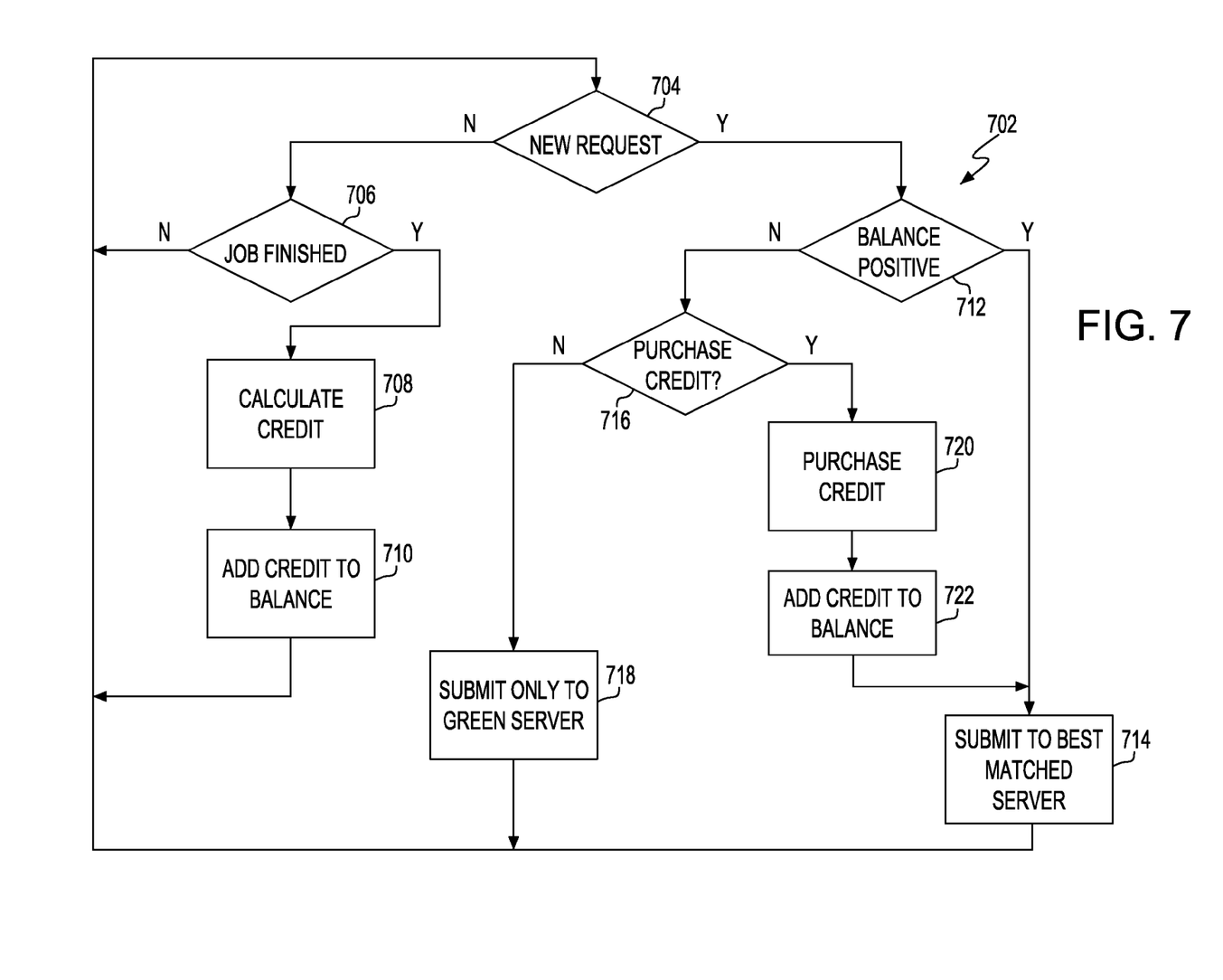
FIG. 7 is a flow chart of the function for handling carbon credit trading.

Referring to FIG. 7, there is shown a flow chart of the function 702 for handling carbon credit trading. A request for carbon credit trading is received, (step 704), where it is determined if the request is a new request. If the request is not a new request, (NO; step 704), the function determines if the job is finished (step 706). If the job is not finished (NO; step 706), the function returns to step 704. If the job is finished (YES; step 706), the function calculates credit (step 708), adds the calculated credit to the balance (step 710), and returns to step 704. Returning to step 704, if the request is a new request (YES; step 704), the function determines if the balance is positive (step 712). When the balance is positive (YES; step 712) the function then advances to "submit to best matched server" (step 714) and then proceeds to step 704. Selection of the best matched server in step 714 may be restricted to nodes which result in addition to the positive credit balance or may add or subtract from the balance dependent on submission parameters for the workload. If the balance is not positive (NO; step 712) the function advances to purchase credit (step 716). If credit is not to be purchased (NO; step 716), the function advances to "submit only to green server" (step 718) and then continues to step 704. If, however, credit is purchased (YES; step 716), the function purchases credit (step 720), adds the credit to balance (step 722) and then advances to step 714.

In one embodiment of the invention jobs are assigned one at a time to a Server Farm (SF). In this embodiment, a job is taken off the queue and assigned to whichever server farm that best meets the criteria of the job (e.g. jobs with green preferences are assigned to green servers).

Still another embodiment considers all jobs in the queue that have not been assigned to a server farm. An embodiment of this method uses linear programming to assign the jobs in combination with alternative job assignment methods. The model formulation handles a single job on a single processor (or server machine) at any given time and allows for multiple jobs within a time period as long as the total time spent by the jobs in that time period does not exceed the duration of the period. This can be extended to machines with multiple processors (ability for a machine to handle multiple jobs) by treating the processors within the machine as individual machines which compete for the same resources. With this embodiment a set of jobs can be handled only by a specific set of servers (e.g. some jobs can be handled only by green servers). This can be achieved either by the resources requirements of the jobs or job preferences.

The linear programming (LP) embodiment can be composed of an objective function that defines a measure of the quality of a given solution, and a set of linear constraints. The types of equations used in job assignment models can include:

1. Backorder Constraints which ensures that each job not assigned in one period is backordered to the next period. (must be assigned in a subsequent period)
2. Resource Capacity Constraints, which ensure that the capacity available for processing job activities including capacity used for jobs already assigned is not exceeded.
3. Assignment Constraints, each job is assigned to one server or server family. The total time jobs spend in a period cannot exceed the duration of the period.

An LP formulation which can be used is provided below in the form familiar to those practiced in the art; i.e., definition of subscripts, definition of objective function coefficients, definition of constants, definition of decision variables, LP formulation or equations.

Definition of Subscripts j—Time period
m—Server or Server farm (could be a single processor)
k—Job k (job arrival number)
w—Server resource e.g. such as memory, disk space, etc.

Definition of Objective Function Coefficients $PRC_{mk}$—cost of processing a job k on a server m.
$BC_{kj}$—penalty for inability to assign job k by the end of period j.

Definition of Constants $REQ_{kw}$—Resource requirements of job k and resource type w.
$RT_{km}$—Run time of job k on server m.
$R_{jmw}$—Total Resource for type w available for processing jobs that have not yet been assigned to server m during time period j.
$BS_j$—bucket size (BS) duration in period j (e.g. number hours in period j).

Definition of LP Decision Variables $X_{jkm}$—Assign job k to SF m in period j. (binary, takes values 0 or 1)
$B_{jk}$—Backorder of job k in period j. $B_{jk}$=0 if job k assigned by period j; 1 otherwise
$Y_{jkm}$—Total time job k spends running on server m in period j.

LP Equations or Formulation

The following minimizes the objective function subject to the constraints shown below.

Objective Function:
Minimize:

$$\sum_j \sum_m \sum_k PRC_{mk} X_{jkm} + \sum_j \sum_k B_{jk} BC_{jk}$$

Subject to:
Backorder Constraints:
Ensures that $B_{jk}$=0 if job k assigned by period j, 1 otherwise $$B_{jk} = B_{(j-1)k} - \sum_m X_{jkm} \forall j, k$$

j=Time period (j=1, 2 . . . N where N is number of time periods) and where
$B_{0k}$=1
Capacity Constraints:
$REQ_{kw} * X_{jkm} \leq R_{mjw} \forall j, w, k, m$ Assignment Constraint: Each job is assigned once.

$$\sum_j \sum_{m \in S(k)} X_{jkm} = 1 \forall k$$

Where S(k) is the set of servers that can handle job k

The following two constraints ensure that once a job has begun processing on a server it completes in the earliest possible period and that the total processing time at a server does not exceed the time available:

$$\sum_{r=v}^{v+\lceil \frac{RT_k}{BS} \rceil} Y_{rkm} = X_{vkm} RT_k \forall k, m$$

Where BS is average period size between periods v and $$v + \lceil \frac{RT_k}{BS} \rceil$$

$$\sum_k Y_{jkm} \leq BS_j \forall j, m$$

Non-Negativity Constraints:
all $X_{i,j...} \geq 0$, where X is a generic decision variable and i, j etc. represent generic subscripts.

The model formulation above can be solved using an LP solver (such as COIN or CPLEX solver) or a rule based heuristic.

The various method embodiments of the invention will be generally implemented by a computer executing a sequence of program instructions for carrying out the steps of the method, assuming all required data for processing is accessible to the computer. The sequence of program instructions may be embodied in a computer program product comprising media storing the program instructions. As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the method, and variations on the method as described herein. Alternatively, a specific use computer, containing specialized hardware for carrying out one or more of the functional tasks of the invention, could be utilized.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM) or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then complied, interpreted, of otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wired, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, though the Internet using an Internet Service Provider).

The present invention is described above with reference to flow chart illustrations and/or block diagrams of methods, apparatus (systems) and computer program products according to embodiments of the invention. It will be understood that each block of the flow chart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instructions means which implement the function/act specified in the flowchart and/or block diagram block of blocks.

The computer program instruction may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although a few examples of the present invention have been shown and described, it would be appreciated by those skilled in the art that changes might be made in these embodiments without departing from the principles and spirit of the invention, the scope of which is defined in the claims and their equivalents.

What is claimed is:

1. A method of allocating a job submission for a computational task to a set of distributed server farms each having at least one processing entity comprising:
    receiving, at a processor device, a workload request from a requesting entity for submission to at least one of the set of distributed server farms;
    auditing, at the processor device, the workload request for environmental impact, monetary, or timing requirements;
    calculating the environmental impact, monetary and/or time costs for each server farm and estimating for each server farm an energy consumption cost for transporting the workload from a job submitting site to that server farm;
    using by said processing device, said calculated environmental impact, monetary, timing requirements, and said estimated energy consumption for transporting of each server farm as conditions for accepting or rejecting at least one of the server farms to which the job submission is to be allocated;
    determining a server farm that can optimize said conditions, and
    dispatching the job submission to the server farm which optimizes the conditions associated with the computational task.

2. The method of claim 1 further comprising:
    using as a condition, at least one of the lowest environmental impact as measured by a power source used to power the server farm, a server farm power performance, and/or an expected processing time of the workload for rejecting a server farm.

3. The method of claim 1 further comprising:
    using as a condition costs associated with the computational task in addition to capability, availability and/or efficiency of a server farm.

4. The method of claim 1 wherein said auditing further comprises:
    determining a requesting entity's participation in a carbon credit trading system, wherein a server farm that implements a carbon trading system calculates carbon credits as a function of CO and/or CO2 level differentials between the energy source used and a base CO2 level used to calculate a carbon credit/debit, said method further comprising:
    calculating an amount of carbon credits associated with the requested workload for said requesting entity; and, using as a condition said calculated amount of carbon credits for selecting a server farm.

5. The method of claim 1 further comprising:
    using as a condition, power suppliers operating either from renewable resources or non-renewable sources.

6. The method of claim 5 further comprising:
    using as a condition, the generation efficiency and environmental footprint per unit of energy produced.

7. The method of claim 1 further comprising:
    estimating when peak energy requirements of the geographical area where a server farm is located is close to the maximum generation/transmission capacity of the geographical area, and said method using as a condition said estimate.

8. A system of allocating a job submission for a computational task to a set of distributed server farms each having at least one processing entity comprising:

a memory storage device;

a processor device, in communication with said memory device, configured to perform a method comprising:

receiving, at a processor device, a workload request from a requesting entity for submission to at least one of the set of distributed server farms;

auditing, at the processor device, the workload request for environmental impact, monetary, or timing requirements;

calculating the environmental impact, monetary and/or time costs for each server farm and estimating for each server farm an energy consumption cost for transporting the workload from a job submitting site to that server farm;

using said calculated environmental impact, monetary, timing requirements, and said estimated energy consumption for transporting of each server farm as conditions for accepting or rejecting at least one of the server farms to which the job submission is to be allocated;

determining a server farm that can optimize said conditions, and dispatching the job submission to the server farm which optimizes the conditions associated with the computational task.

9. The system of claim 8 further comprising:
using as a condition as least one of the lowest environmental impact as measured by a power source used to power the server farm, a server farm power performance, and/or an expected processing time of the workload for rejecting a server farm.

10. The system of claim 8 further comprising:
using as a condition costs associated with the computational task in addition to capability, availability and/or efficiency of a server farm.

11. The system of claim 8 wherein a server farm implements a carbon trading system which calculates carbon credits as a function of CO and/or $CO_2$ level differentials between the energy source used and a base $CO_2$ level used to calculate a carbon credit/debit, said method further comprising: determining a requesting entity's participation in a carbon credit trading system, calculating an amount of carbon credits associated with the requested workload for said requesting entity; and, using as a condition said calculated amount of carbon credits for selecting a server farm.

12. The system of claim 8 further comprising:
using as a condition, power suppliers operating either from renewable resources or non-renewable sources.

13. The system of claim 12 further comprising:
using as a condition, the generation efficiency and environmental footprint per unit of energy produced.

14. The system of claim 8 further comprising:
estimating when peak energy requirements of the geographical area where a server farm is located is close to the maximum generation/transmission capacity of the geographical area, and said method using as a condition said estimate.

15. A computer program product for use with a computer, the computer program product including a non-transitory computer readable medium having recorded thereon a computer program or program code for causing the computer to perform a method for storing and retrieving data, the method further comprising:

receiving, at the computer, a workload request from a requesting entity for submission to at least one of the set of distributed server farms;

auditing, at the computer, the workload request for environmental impact, monetary, or timing requirements;

calculating the environmental impact, monetary and/or time costs for each server farm and estimating for each server farm an energy consumption cost for transporting the workload from a job submitting site to that server farm;

using said calculated environmental impact, monetary, timing requirements, and said estimated energy consumption for transporting of each server farm as conditions for accepting or rejecting at least one of the server farms to which the job submission is to be allocated;

determining a server farm that can optimize said conditions, and dispatching the job submission to the server farm which optimizes the conditions associated with the computational task.

16. The computer program product of claim 15 further comprising:
using as a condition, the lowest environmental impact as measured by a power source used to power the server farm, a server farm power performance, and/or an expected processing time of the workload for rejecting a server farm.

17. The computer program product of claim 15 wherein a server farm implements a carbon trading system calculates carbon credits as a function of CO and/or $CO_2$ level differentials between the energy source used and a base $CO_2$ level used to calculate a carbon credit/debit, said method further comprising: determining a requesting entity's participation in a carbon credit trading system, calculating an amount of carbon credits associated with the requested workload for said requesting entity; and, using as a condition said calculated amount of carbon credits for selecting a server farm.

18. The computer program product of claim 15 further comprising:
using as a condition, power suppliers operating either from renewable resources or non-renewable sources.

19. The computer program product of claim 18 further comprising:
using as a condition, the generation efficiency and environmental footprint per unit of energy produced.

20. The computer program product of claim 15 further comprising:
estimating when peak energy requirements of the geographical area where a server farm is located is close to the maximum generation/transmission capacity of the geographical area, and said method using as a condition said estimate.

21. The method of claim 1 further comprising:
using as a condition, information concerning a perceived security risk where a server farm having processing power is selected according to areas of safety or away from areas of instability.

22. The system of claim 8 further comprising:
using as a condition, information concerning a perceived security risk where a server farm having processing power is selected according to areas of safety or away from areas of instability.

23. The method of claim 1, wherein said determining a server farm that optimizes conditions associated with the computational task further comprises:
solving an objective function to determine a quality measure of a given job assignment given a set of linear constraints; and
said solving including generating an optimized schedule indicating a list of jobs, an assigned time to run said job and on which server of said server farm said task is to be run for both in coming jobs and jobs queued to run in a subsequent time period.

24. The method of claim 23, wherein said set of linear constraints comprises:
a backorder constraint governing that each job not assigned in one time period is backordered to a subsequent time period;
a resource capacity constraint governing that a capacity available for processing a job and including capacity used for jobs already assigned is not exceeded; and,
an assignment constraint to ensure that each job is assigned to one or more servers, wherein a total time a job is spent in a period does not exceed the duration of the time period.

25. The system of claim 8, wherein said determining a server farm that optimizes conditions associated with the computational task further comprises:
solving an objective function to determine a quality measure of a given job assignment given a set of linear constraints; and
said solving including generating an optimized schedule indicating a list of jobs, an assigned time to run said job and on which server of said server farm said task is to be run for both in coming jobs and jobs queued to run in a subsequent time period.

26. The system of claim 25, wherein said set of linear constraints comprises:
a backorder constraint governing that each job not assigned in one time period is backordered to a subsequent time period;
a resource capacity constraint governing that a capacity available for processing a job and including capacity used for jobs already assigned is not exceeded; and,
an assignment constraint to ensure that each job is assigned to one or more servers, wherein a total time a job is spent in a period does not exceed the duration of the time period.

27. The method of claim 5, further comprising:
ranking, by said processing device, said server farms according to data associated with said energy consumption, said environmental impact, and availability of servers within each server farm,
ranking, by said processor device, said power suppliers that provide power to said server farms according to data indicating whether the power supplier is operating from renewable resources as opposed to non-renewable resources, and power supplier preferences of a type of renewable resource; and
correlating data associated with ranked server farms with ranked power supplier data from power suppliers to determine the server farm which optimizes a job submission criteria.

28. The system of claim 12, further comprising:
ranking, by said processing device, said server farms according to data associated with energy consumption, said environmental impact, and availability of servers within each server farm,
ranking, by said processor device, said power suppliers that provide power to said server farms, according to data indicating whether the power supplier is operating from renewable resources as opposed to non-renewable resources, and power supplier preferences of a type of renewable resource; and
correlating data associated with ranked server farms with ranked power supplier data from power suppliers to determine the server farm which optimizes a submission criteria.

* * * * *